United States Patent [19]

Weder et al.

[11] Patent Number: 5,363,592
[45] Date of Patent: Nov. 15, 1994

[54] METHOD FOR GROWING BOTANICAL ITEMS AND PROVIDING A DECORATIVE COVER FOR SAME

[75] Inventors: Donald E. Weder, Highland; William F. Straeter, Breese, both of Ill.

[73] Assignee: Highland Supply Corporation, Highland, Ill.

[21] Appl. No.: 922,302

[22] Filed: Jul. 30, 1992

[51] Int. Cl.$^5$ ............................................. A01B 79/00
[52] U.S. Cl. ......................................... 47/58; 47/66; 47/75
[58] Field of Search .................... 47/72, 75, 73, 66

[56] References Cited

U.S. PATENT DOCUMENTS

| | | | |
|---|---|---|---|
| 1,421,628 | 7/1922 | Watkins | 47/72 |
| 1,951,642 | 3/1934 | Augustin | 47/72 |
| 1,988,691 | 1/1935 | Lovett | 47/73 |
| 2,967,652 | 1/1961 | Canfield | 47/72 |
| 3,022,605 | 2/1962 | Reynolds | 47/58 |
| 3,362,105 | 1/1968 | Steiger | 47/73 |
| 4,006,561 | 2/1971 | Thoma | 47/84 |
| 4,043,077 | 8/1977 | Stonebocker | 47/72 |
| 4,142,324 | 3/1979 | Magyar | 47/75 |
| 4,223,480 | 9/1980 | Welty | 47/75 |
| 4,773,182 | 9/1988 | Weder et al. | |
| 5,085,003 | 2/1993 | Garcia | 47/84 |
| 5,111,638 | 5/1992 | Weder | |

FOREIGN PATENT DOCUMENTS

| | | | |
|---|---|---|---|
| 18303 | 10/1980 | European Pat. Off. | 47/75 |
| 163453 | 12/1985 | European Pat. Off. | 47/72 |
| 2735225 | 4/1978 | Germany | 47/73 |

OTHER PUBLICATIONS

Exhibit A–"The Simple Solution For Those Peak Volume Periods", Highland Supply Speed Cover ® Brochure, 1989 ©, 6 pages.
Exhibit B–"Speed Sheets ® And Speed Rolls", Highland Supply Speed Sheets ® Brochure, 1990 ©, 2 pages.
Exhibit C–"A World of Cut Flower and Pot Plant Packaging", Klerk's Plastic Products Manufacturing Inc. Brochure, date unknown, 6 pages.

*Primary Examiner*—Henry E. Raduazo
*Attorney, Agent, or Firm*—Dunlap, Codding & Lee

[57] ABSTRACT

A method for growing botanical items where a liner is disposed in a container. A growing medium is disposed in the liner and a propagule is disposed in the growing medium. When the botanical item has grown to the desired extent, the liner with the growing medium in the botanical item disposed therein is removed from the container and disposed in a decorative covering thereby permitting the container to be reused for growing other botanical items. In one other embodiment, the decorative covering is placed in the container and the botanical item is grown in the decorative covering which then is removed from the container. In one other embodiment, the botanical item is grown in the decorative covering without the necessity of using a container.

14 Claims, 2 Drawing Sheets

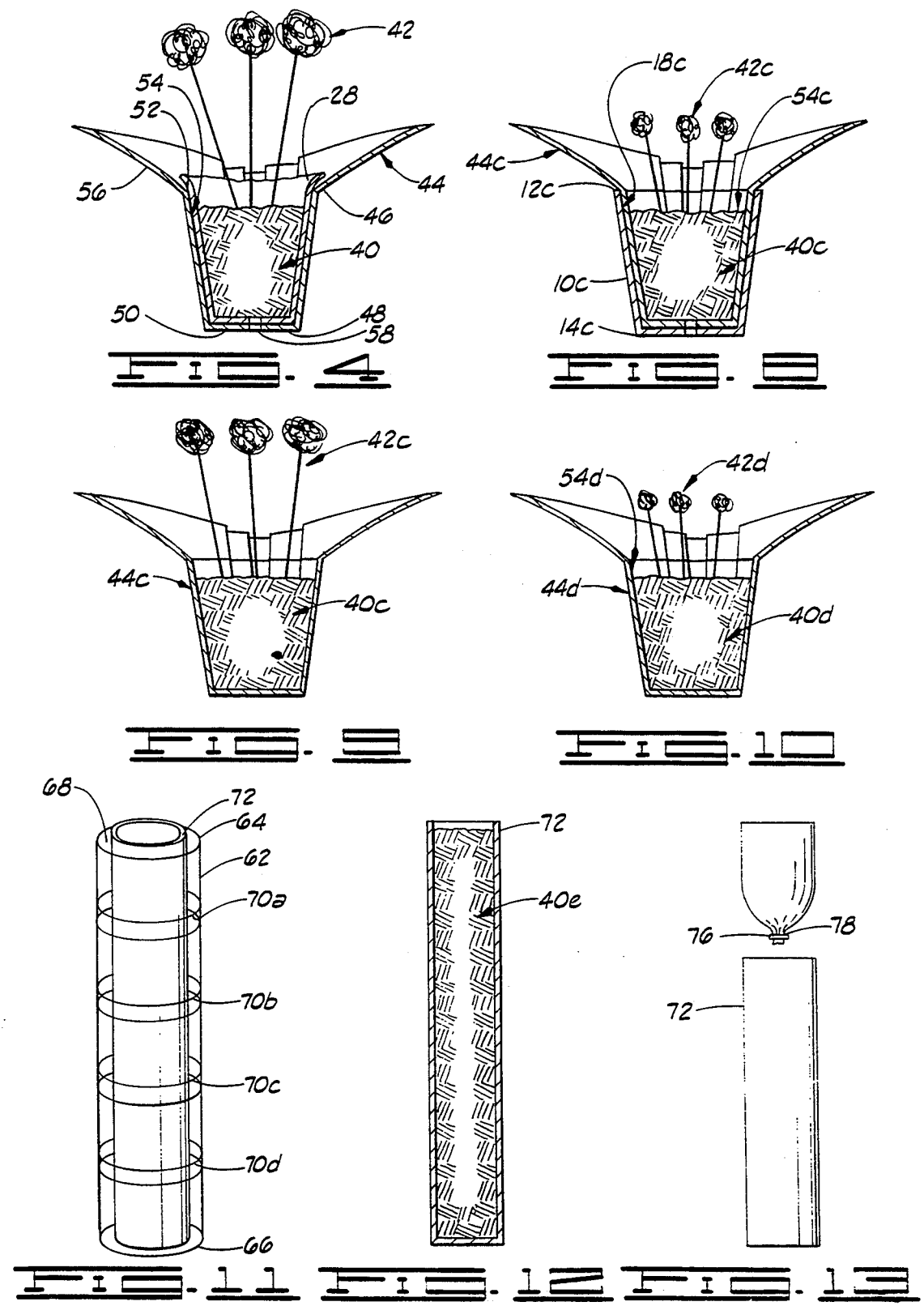

METHOD FOR GROWING BOTANICAL ITEMS AND PROVIDING A DECORATIVE COVER FOR SAME

FIELD OF THE INVENTION

The present invention relates generally to a method for growing plants or flowers and, more particularly, but not by way of limitation, to a method for growing plants or flowers wherein (a liner is placed in a container and the flowers or plants are grown in the liner and the liner subsequently is removed from the container and placed in a decorative cover or where a decorative cover is placed in the container and the flower or plant is grown in the decorative cover which then is removed from the container or wherein the flower or plant is grown in the decorative cover without the necessity of the container.

BRIEF DESCRIPTION OF THE DRAWINGS

FIG. 5 is an elevational view of a modified liner.

FIG. 8 is a sectional view of a container showing a decorative cover disposed in the container with growing medium disposed in the decorative cover and a botanical item growing from the growing medium.

FIG. 9 is a sectional view of the flower pot cover of FIG. 8 removed from the container shown in FIG. 8.

FIG. 10 is a sectional view of a decorative cover with growing medium and a botanical item disposed therein.

FIG. 11 is a schematic, diagrammatic view of a system for constructing the liners of the present invention.

FIG. 12 is a view of the tube portion of the system shown in FIG. 11 with growing medium disposed therein.

FIG. 13 is a schematic, diagrammatic view of the tube of FIG. 12 showing a liner separated from the tube and showing growing medium in the tube and the liner separated from the tube.

DESCRIPTION OF THE PREFERRED EMBODIMENTS

In growing plants or flowers, it is common to place a growing medium such as earth in a container and then plant a growing agent in the growing medium. The plants or flowers then are grown in the container. After the plants or flowers have grown to a desired extent, a decorative cover then is commonly placed about the container and the container with the plants or flowers disposed therein and the decorative cover disposed thereon then is commonly sold to the customer. This process, results in the sale of the plant container and new containers then must be utilized for growing additional plants and flowers. The present invention particularly is directed to systems for growing plants or flowers where the containers may be reutilized or, in one embodiment, a system where a container is not required thereby eliminating the cost involved in using containers.

Figure 1:
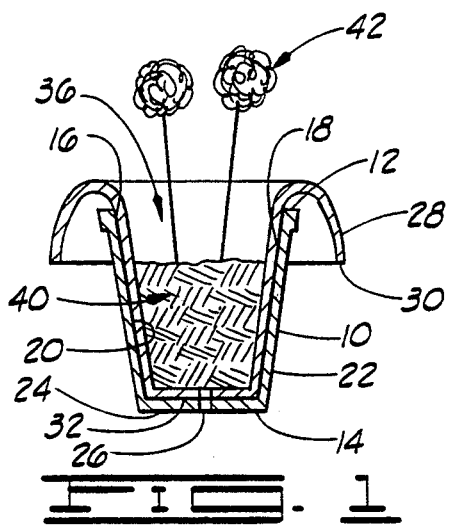
FIG. 1 is a sectional view of a container with a liner disposed therein and with growing medium and showing diagrammatically a botanical growing in the growing medium.

Shown in FIG. 1 and designated therein by a reference numeral 10 is a container of the type commonly referred to as a flower pot for example. The container 10 has an upper end 12 and a lower end 14. An opening 16 is formed through the upper end 12 of the container 10 with the opening 16 providing access to a container retaining space 18 formed in the container 10. The container 10 has an interior surface 20 surrounding a substantial portion of the container retaining space 18. The container 10 also has an exterior surface 22.

The lower end 14 of the container 10 is closed to form a bottom 24 of the container 10. A hole 26 is formed through the bottom 24 of the container 10. One hole 26 is shown in FIG. 1 by way of example, although a series of holes also could be included or formed through the bottom 24 of the container 10 if desired in a particular application. The hole 26 or holes provides a way for fluids to drain from the container retaining space 18.

Figure 2:
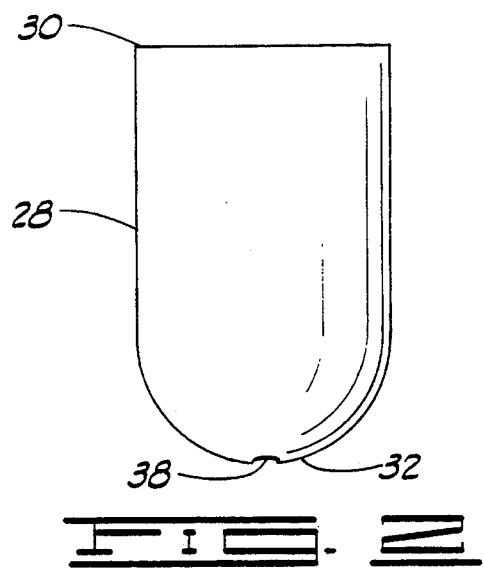
FIG. 2 is an elevational view of a liner constructed in accordance with the present invention and disposed in the container shown in FIG. 1.

A liner 28 (FIGS. 1, 2 and 3) is disposed in the container retaining space 18 of the container 10. The liner 28 has an upper end 30 and a lower end 32. An opening 34 is formed through the upper end 30 of the liner 28. The opening 34 provides access to a liner retaining space 36. The liner 28 surrounds a substantial portion of the liner retaining space 36. A hole 38 is formed through the lower end 32 of the liner 28. Although only one hole 38 is shown in FIGS. 1 and 2, the liner 28 may include more than one hole such as the hole 38 if desired in a particular application or, in the alternative, the hole 38 in the liner 28 may be eliminated and/or the hole 26 in the container 10 may be eliminated if desired in a particular application.

The liner 28 is constructed from any suitable flexible material. Preferably, the liner 28 is constructed of a polymer film.

The term "polymer film" as used herein means any polymer film. For example, but not by way of limitation, one polymer film is a polypropylene film. Another example of a polymer film, but not by way of limitation, is cellophane.

The liner 28 has a thickness in a range from about 0.1 mils to about 10 mils. Preferably, the liner 28 has a thickness in a range from about 0.1 mils to about 3 mils.

The liner 28 may be constructed of a single layer of material or a plurality of layers of the same or different types of materials. Additionally, an insulating material such as bubble film, preferable as one of two or more layers, can be utilized in order to provide additional protection. The layers of material comprising the liner 28 may be connected together or laminated or may be separate layers.

A decorative pattern, such as a color and/or an embossed pattern, and/or other decorative surface ornamentation may be applied to the upper surface and/or the lower surface of the liner 28 or portions thereof including, but not limited to printed design, coatings, colors, flocking or metallic finishes. The liner 28 also may be totally or partially clear or tinted transparent material.

In operation, the liner 28 is disposed in the container retaining space 18. The liner 28 is positioned in the container retaining space 18 so that the liner 28 covers substantially the entire interior surface 20 of the container 28. In this position, a portion of the liner 28 near the upper end 30 there of extends over and outwardly from the upper end 12 of the container 10. Further, in this position, the hole 38 in the liner 28 generally is aligned with the hole 26 in the container 18, although the hole 38 in the liner 28 may be misaligned with the hole 26 in the container 18. The liner 28 is disposed about adjacent the interior surface 20 of the container 10.

After the liner 28 has been placed in the container 10, growing medium 40 is disposed in the liner retaining space 36 of the liner 28. A propagule (not shown) capable of growing into a botanical item then is disposed in the growing medium 40.

The term "botanical item" as used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" as used herein means any structure capable of being propagated or acting as an agent of reproduction including seeds, shoots, stems, runners, tubers, plants, leaves, roots or spores.

The term "growing medium" used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

Figure 4:
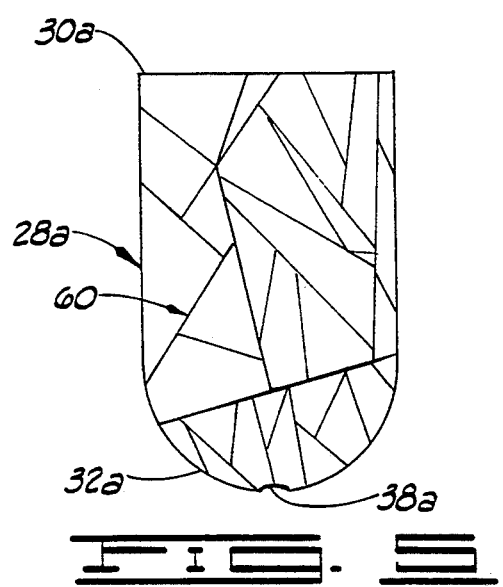
FIG. 4 has a sectional view showing a flower pot cover with the liner of FIG. 1 removed from the container shown in FIG. 1 and disposed in the flower pot cover of FIG. 4.

The propagule then is permitted to grow in the growing medium 40 until the resulting botanical item has grown to the desired extent (a botanical item being diagrammatically shown in FIG. 1 and designated therein by the general reference numeral 42). The liner 28 having the growing medium 40 and the botanical item 42 therein then is removed from the container 10 and disposed in a decorative covering 44 (FIG. 4).

The decorative covering 44 (FIG. 4) has an upper end 46 and a lower end 48. The lower end 48 is closed to form a bottom 50 of the decorative covering 44. An opening 52 is formed through the upper end 46 of the decorative covering 44 providing access to a covering receiving space 54. A skirt 56 is formed on the upper end 46 of the decorative covering 44 and the skirt 56 extends a distance outwardly from the upper end 46 of the decorative covering 44.

In one preferred form, the decorative covering 44 is formed by placing a sheet of material between a male and a female mold and molded into the shape of the decorative covering 44 via the male and the female molds in the manner described in U.S. Pat. No. 4,773,182, issued to Donald E. Weder, et al., issued on Sep. 27, 1988, the description of this patent being in specifically incorporated herein by reference. In this instance, the decorative covering 44 includes a plurality of overlapping folds extending at different or varying distances and at different or varying angles which cooperate to provide structural integrity to the decorative covering 44.

The decorative covering 44 is constructed of any suitable material. Preferably, the decorative covering 44 is constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The decorative covering 44 has a thickness in a range from about 0.1 mils to about 30 mils. Preferably, the decorative covering 44 has a thickness in a range from about 0.1 mils to about 10 mils.

The decorative covering 44 may be constructed of a single layer of materials or a plurality of layers of the same or different types of materials. The layers of material comprising the decorative covering 44 may be connected together or laminated or may be in separate layers.

A decorative pattern, such as a color and/or an embossed pattern, and/or any other decorative surface ornamentation may be applied to the upper surface and/or the lower surface of the decorative covering 44 or portions thereof including, but not by way of limitation, a printed design, coatings, colors, flocking or metalic finishes. The decorative covering 44 also may be totally or partially clear or tinted transparent material.

The liner 28 more specifically is disposed in the cover receiving space 54 of the decorative covering 44 and positioned therein so that the upper end 30 of the liner 28 is about adjacent the upper end 46 of the decorative covering 44. In this assembled position, the liner 28 substantially encompasses the covering receiving space 54. The decorative covering 44 provides the support for the liner 28 and the growing medium 40 and the botanical item 42.

The decorative covering 44 includes a hole 58 formed in the bottom 50 thereof. The decorative covering 44 may include more than one hole like the hole 58 or may include no holes if desired in a particular application.

EMBODIMENT OF FIG. 5

Figure 3:
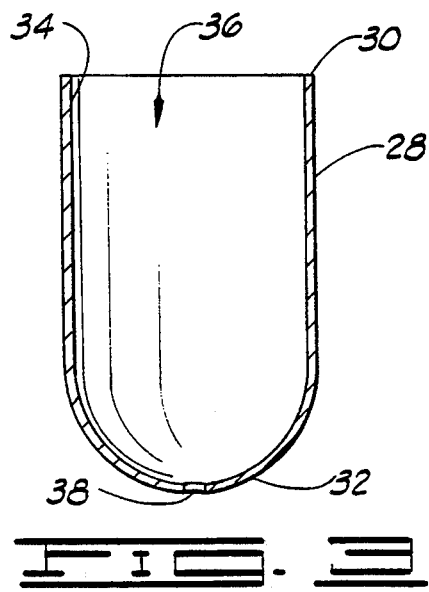
FIG. 3 is a sectional view of the liner of FIG. 2.

Shown in FIG. 5 is a modified liner 28a which is constructed exactly like the liner 28 shown in FIGS. 1, 2 and 3 and described in detail, except the liner 28a is constructed from a sheet of material formed between a male and a female die having a plurality of overlapping folds 60 in a manner like that described before with respect to the decorative covering 44 and as described in U.S. Pat. No. 4,773,182, referred to before.

EMBODIMENT OF FIGS. 6 AND 7

In this embodiment, the liner 28 is placed in a first container 10a along with the growing medium and the propagule. The container 10a is constructed exactly like the container 10 shown in FIG. 1 and described in detail before, except the container 10a is smaller than the container 10 and the liner 28 thus is larger than the container 10a so that a greater portion of the liner 28 extends beyond the upper end 12a of the container 10a when the liner 28 is disposed in the container retaining space 18a.

Figure 7:
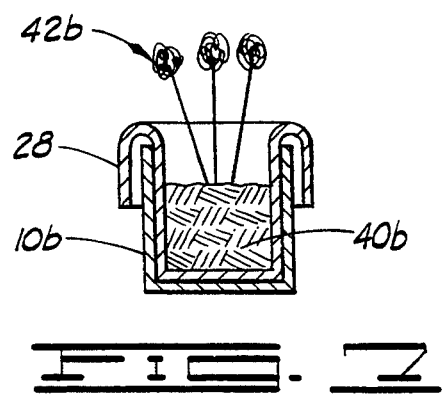
FIG. 7 is a sectional view showing another container where the liner of FIG. 6 with the growing medium and the botanical item being removed from the plant container shown in FIG. 6 and disposed in the modified container shown in FIG. 1.

In this embodiment, the botanical item 42a is grown in the growing medium 40a until the botanical item 42a has grown to a desired extent. The liner 28 then is removed from the container 10a and placed in a larger container 10b (FIG. 7). The container 10b is constructed exactly like the container 10.

After the botanical item 42b has grown in the growing medium 42b to the desired extent, the liner 28 is removed from the container 10b and placed in the decorative covering in the manner exactly like that described before in connection with FIG. 4 and the decorative covering 44.

Figure 6:
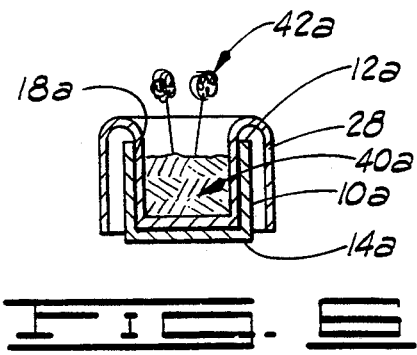
FIG. 6 is a sectional view showing a plant container with a liner disposed therein and with growing medium disposed in the liner and showing diagrammatically a botanical item growing from the growing medium.

The system shown in FIGS. 6 and 7 will operate exactly like the system described before in connection with FIGS. 1, 2, 3 and 4, except the botanical item 42a is grown first in a small container 10a and then removed from the small container 10a and placed in the larger container 10b to be grown to the next desired extent. Both containers 10a and 10b may be reused for growing botanical items. The growing medium 40a and 40b may be identical to the growing medium 40, and normally additional growing medium 40b as compared to the amount of growing medium 40a. In the alternative, different growing medium or different additives may be added to the growing medium 40b in connection with the container 10b.

EMBODIMENT OF FIGS. 8 AND 9

Shown in FIG. 8 is a container 10c which is constructed exactly like the container 10 shown in FIG. 1 and described in detail before. Also, shown in FIG. 1 is a decorative covering 44c constructed exactly like the decorative covering 44 shown in FIG. 4 described in detail before.

In this embodiment, the decorative covering 44c is placed in the container receiving space 18c of the container 10c. The growing medium 40c is disposed in the covering receiving space 54 and the propagule is disposed in the growing medium 40c. The botanical item 42c is grown in the growing medium 40 to the desired extent and the decorative covering 44c with the growing medium 40c and the botanical item 42c disposed therein is removed from the decorative covering 44c, as shown in FIG. 9. The decorative covering 44c with the growing medium 40c and the botanical item 42c then is shipped to the customer.

EMBODIMENT OF FIG. 10

Shown in FIG. 10 is a decorative covering 44d constructed exactly like the decorative covering 44 show in FIG. 4 and described in detail before. In this embodiment, the growing medium 40d is disposed in the covering receiving space 54d and the propagule is disposed in the growing medium 40d where the botanical item 42d is grown to the desired extent in the decorative covering 44d. When the botanical item 42d is grown to the desired extent, the decorative covering 44d with the growing medium 40d and the botanical item 42d then is shipped to the customer. This embodiment eliminates the need for a container such as the container 10, 10a or 10b or 10c, for example.

EMBODIMENT OF FIGS. 11, 12 AND 13

Shown in FIG. 11 is a support 62 having an upper end 64 and a lower end 66. An opening 68 extends through the support 62 intersecting the upper and the lower ends 64 and 66. A plurality of spaced apart slots 70 (four slots 70 being shown in FIG. 11 and designated therein by the referenced numerals 70a, 70b, 70c and 70d) are formed in the support 62 with each slot 70 providing access to a portion of the opening 64.

A tube of material 72 is disposed in the opening 68 in the support 72 with the tube of material 72 extending through the opening 68 and one end of the tube 72 being disposed near the lower end 64 and the opposite end of the tube 72 being disposed near the lower end 66 of the support 62.

The tube of material 72 is constructed of a material exactly like that described before in connection with the liner 28. The lower end of the tube 72 is closed by either heat sealing the adjacent portions of the tube 72 near the lower end thereof to form a closed lower end of the tube of material 72 or by tying off the lower end with a tie to provide a closed lower end.

The tube of material 72 supported within the support 62 is filled with growing medium 40e (FIG. 12) which is exactly like the growing medium 40 described before. A portion of the tube of material 72 near the slot 70a is closed by hand or with some mechanical device to squeeze the portions of the tube of material 72 generally adjacent the slot 70a thereby closing the opening in the tube 72 (FIG. 13). The squeezed portions of the tube of material 72 may be heat sealed or tied off with a tie 76 (FIG. 13) to form a closed lower end of a liner 78 thereby forming a liner 78 suitable for use as the liner 28 described before, except the liner 78 already is filled with growing medium 40e. Additional liners 78 are formed in a similar manner by squeezing off portions of the tube of material 72 through the slots 70b, 70c and 70d.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for growing botanical items comprising:
   providing a liner having an upper end with an opening formed therethrough providing access to a liner retaining space and a lower end;
   providing a container having an upper end with an opening formed through the upper end providing access to a container retaining space and a lower end;
   placing the liner in the container retaining space and positioning the liner in the container retaining space where the opening in the upper end of the liner is disposed near the opening in the upper end of the container;
   placing growing medium in the liner retaining space;
   placing a propagule in the growing medium;
   growing a botanical item in the growing medium in the liner;
   providing a decorative covering with an upper end and a lower end with an opening formed through the upper end thereof providing access to a covering receiving space;
   removing the liner with the growing medium and the botanical items therein from the container; and
   disposing the liner with the growing medium and the botanical items therein in the covering receiving space of the decorative covering.

2. The method of claim 1 wherein the step of providing the container is defined further as providing the container having an interior surface surrounding a substantial portion of the container retaining space and an exterior surface, and wherein the step of placing the liner in the container receiving space is defined further as placing the liner in the container receiving space with the liner being disposed adjacent a substantial portion of the interior surface of the container.

3. The method of claim 1 wherein the step of providing the liner is defined further as providing the liner constructed of a polymer film.

4. The method of claim 1 wherein the step of providing the liner is defined further as providing the liner having a thickness in a range from about 0.1 mils to about 10 mils.

5. The method of claim 1 wherein the step of providing the liner is defined further as providing the liner having a thickness in a range from about 0.1 mils to about 3 mils.

6. A method for growing a botanical item comprising:
providing a liner having an upper end with an opening formed therethrough providing access to a liner retaining space and a lower end;
providing a container having an upper end with an opening formed through the upper end providing access to a container retaining space and a lower end;
placing the liner in the container retaining space and positioning the liner in the container retaining space where the opening in the upper end of the liner is disposed near the opening in the upper end of the container;
placing growing medium in the liner retaining space;
placing a propagule in the growing medium;
growing a botanical item in the growing medium in the liner;
providing a decorative covering with an upper end and a lower end with an opening formed through the upper end thereof providing access to a covering receiving space;
removing the liner with the growing medium and the botanical item therein;
disposing the liner with the growing medium and the botanical item therein in the covering receiving space of the decorative covering; and
wherein the step of providing the liner and the step of disposing growing medium in the liner further comprise:
providing a tube of material having an upper end with an opening formed through the upper end and extending a distance through the tube;
filling the opening in the tube of material with growing medium; and
severing a portion of the tube of material from the tube, spaced a distance from the upper end of the tube of material and closing the severed portion of the tube of material to form the liner having the growing medium disposed therein.

7. A method for growing botanical items comprising:
providing a liner having an upper end with an opening formed therethrough providing access to a liner retaining space and a lower end;
providing a first container having an upper end with an opening formed through the upper end providing access to a container retaining space and a lower end;
placing the liner in the container retaining space of the first container and positioning the liner in the container retaining space of the first container where the opening in the upper end of the liner is disposed near the opening in the upper end of the first container;
placing growing medium in the liner retaining space;
placing a propagule in the growing medium;
growing the botanical items in the growing medium in the liner;
removing the liner with a growing medium and the botanical item therein from the container retaining space of the first container;
providing a second container having an upper end with an opening formed through the upper end providing access to a container retaining space;
placing the liner in the container receiving space of the second container and positioning the liner in the container retaining space of the second container where the opening in the upper end of the liner is disposed near the opening in the upper end of the second container;
growing the botanical item in the growing medium in the liner disposed in the second container;
providing a decorative covering with an upper end and a lower end with an opening formed through the upper end thereof providing access to a covering receiving space;
removing the liner with the growing medium therein and the botanical item from the second container; and
disposing the liner with the growing medium and the botanical item therein in the covering receiving space of the decorative covering.

8. The method of claim 7 wherein the step of providing the liner and wherein the step of disposing growing medium in the liner further comprises:
providing a tube of material having an upper end with an opening formed through the upper end and extending a distance through the tube;
filling the opening in the tube of material with growing medium;
severing a portion of the tube of material from the tube, spaced a distance from the upper end of the tube of material and closing the severed portion of the tube of material to form the liner having the growing medium disposed therein.

9. The method of claim 7 wherein the step of providing the second container is defined further as providing the second container of a size larger than the first container.

10. The method of claim 7 wherein the step of providing the container is defined further as providing the container having an interior surface surrounding a substantial portion of the container retaining space and an exterior surface, and wherein the step of placing the liner in the container receiving space is defined further as placing the liner in the container receiving space with the liner being disposed adjacent a substantial portion of the interior surface of the container.

11. The method of claim 7 wherein the step of providing the liner is defined further as providing the liner constructed of a polymer film.

12. The method of claim 7 wherein the step of providing the liner is defined further as providing the liner having a thickness in a range from about 0.1 mils to about 10 mils.

13. The method of claim 7 wherein the step of providing the liner is defined further as providing the liner having a thickness in a range from about 0.1 mils to about 3 mils.

14. A method for growing a botanical item comprising:
- providing a container having an upper end with an opening formed through the upper end providing access to a container retaining space and a lower end;
- providing a decorative covering with an upper end and a lower end with an opening formed through the upper end thereof providing access to a covering receiving space;
- placing the decorative covering in the container retaining space and positioning the decorative covering in the container retaining space where the opening in the upper end of the decorative covering is disposed near the opening in the upper end of the container;
- disposing growing medium in the covering receiving space of the decorative covering;
- growing the botanical item in the growing medium in the decorative covering;
- removing the decorative covering with the growing medium and the botanical item disposed therein from the container; and
- wherein the step of providing the decorative cover and the step of disposing growing medium in the decorative covering further comprise:
- providing a tube of material having an upper end with an opening formed through the upper end and extending a distance through the tube;
- filling the opening in the tube of material with growing medium; and
- severing a portion of the tube of material from the tube, spaced a distance from the upper end of the tube of material and closing the severed portion of the tube of material to form the decorative cover having the growing medium disposed therein.

* * * * *

UNITED STATES PATENT AND TRADEMARK OFFICE
CERTIFICATE OF CORRECTION

PATENT NO. : 5,363,592                      Page 1 of 3
DATED : November 15, 1994
INVENTOR(S) : Weder et al.

It is certified that error appears in the above-identified patent and that said Letters Patent is hereby corrected as shown below:

Cover page, ABSTRACT, fifth line, please delete "in" and substitute therefor --and--.

Column 1, line 10, please delete "(".

Column 1, line 23, after "botanical" please insert --item--.

Column 1, line 29, please delete "has" and substitute therefor --is--.

Column 1, line 40, please delete "being" and substitute therefor --has been--.

Column 2, line 4, after "process" please delete ",".

Column 3, line 7, please delete "container 28" and substitute therefor --container 10--.

Column 3, line 12, please delete "container 18" and substitute therefor --container 10--.

Column 3, line 14, please delete "container 18" and substitute therefor --container 10--.

Column 3, line 64, after "being" please delete "in".

UNITED STATES PATENT AND TRADEMARK OFFICE
CERTIFICATE OF CORRECTION

PATENT NO. : 5,363,592

DATED : November 15, 1994

INVENTOR(S) : Weder et al.

It is certified that error appears in the above-identified patent and that said Letters Patent is hereby corrected as shown below:

Column 4, lines 29-30, please delete "metalic" and substitute therefor --metallic--.

Column 5, lines 5-6, please delete "growing medium 42b" and substitute therefor --growing medium 40b--.

Column 5, line 20, after "growing medium 40b" please insert --is used--.

Column 5, line 29, please delete "FIG. 1" and substitute therefor --FIG. 8--.

Column 5, line 36, please delete "54" and substitute therefor --54c--.

Column 5, line 38, please delete "40" and substitute therefor --40c--.

Column 5, line 49, please delete "show" and substitute therefor --shown--.

Column 6, line 2, please delete "opening 64" and substitute therefor --opening 68--.

Column 6, line 4, please delete "support 72" and substitute therefor --support 62--.

UNITED STATES PATENT AND TRADEMARK OFFICE
CERTIFICATE OF CORRECTION

PATENT NO. : 5,363,592

DATED : November 15, 1994

INVENTOR(S) : Weder et al.

It is certified that error appears in the above-indentified patent and that said Letters Patent is hereby corrected as shown below:

Column 6, line 6, please delete "lower end 64" and substitute therefor --upper end 64--.

Signed and Sealed this

Twenty-first Day of May, 1996

Attest:

BRUCE LEHMAN

Attesting Officer

Commissioner of Patents and Trademarks